June 24, 1930.                C. C. PEARSON ET AL                1,768,370
                                 NONSKID OVERSHOE
                              Filed July 8, 1929        2 Sheets-Sheet 2
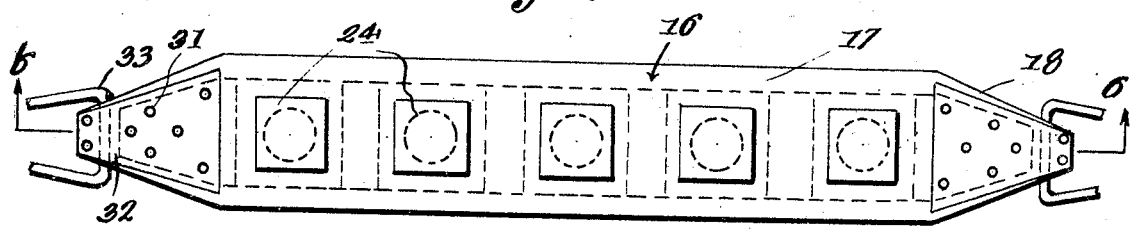
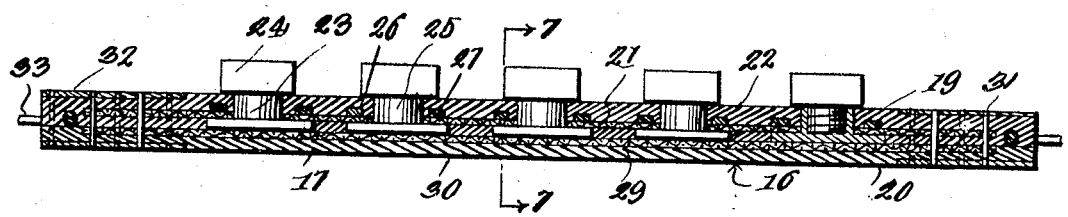
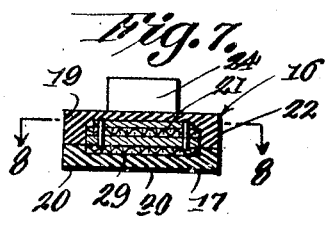 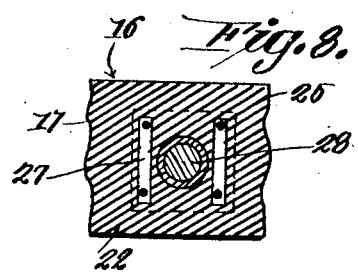
Inventor
CHARLES C. PEARSON
ELI M. McLELLAN Patented June 24, 1930

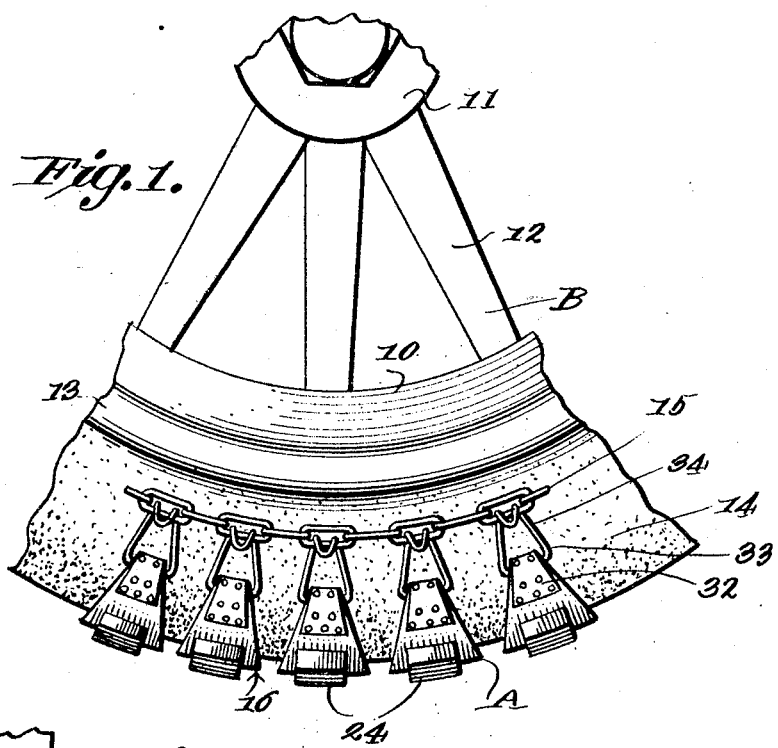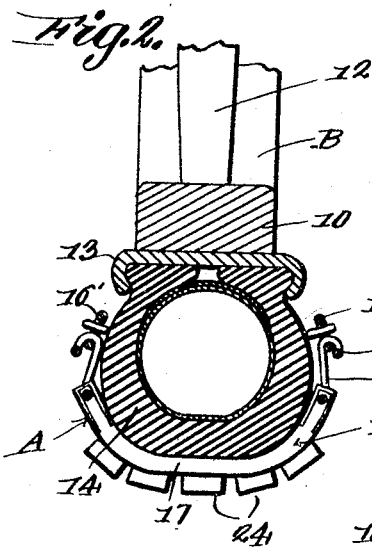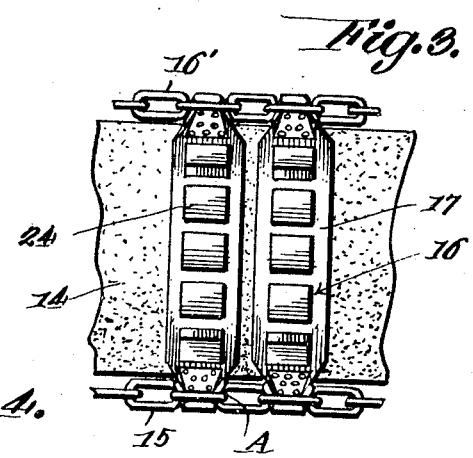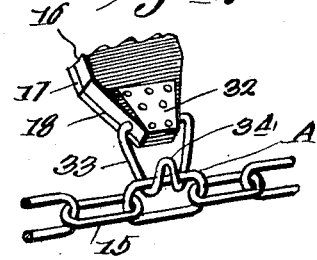

1,768,370

UNITED STATES PATENT OFFICE

CHARLES C. PEARSON, OF NORTH PROVIDENCE, AND ELI M. McLELLAN, OF CRANSTON, RHODE ISLAND

NONSKID OVERSHOE

Application filed July 8, 1929. Serial No. 376,578.

This invention appertains to attachments for vehicle wheels and more particularly to a non-skid and traction tread attachment for pneumatic or other tires for automotive vehicles.

One of the primary objects of our invention is to provide a novel device for use on the rear wheels or tires of an automobile to give the vehicle locomotion or stopping qualities in wet weather or bad roads or snow and ice covered highways and to effectively prevent skidding on such highways.

Another important object of our invention is to provide a non-skid and traction attachment for pneumatic tires embodying a plurality of transversely extending tread members and side circumferentially extending chain members for holding said tread members in proper position transversely of the tread of the tire.

A further important object of our invention is the provision of novel means for detachably connecting the tread members to the side circumferentially extending chains, whereby any one of said tread members can be removed and replaced, when necessary or desirable, without interfering with any of the other tread members.

A further salient object of our invention is the provision of novel traction lugs carried by each of the tread members with novel means for detachably anchoring the tread lugs in said tread members, whereby the lugs can be removed independently of one another from each of the said members so as to permit the renewal thereof when the same become worn or mutilated.

A further object of our invention is the provision of novel means for forming each one of the tread members whereby a durable and strong structure will be had and whereby the anchoring members for the tread lugs will be effectively held in position.

A still further object of our invention is to provide an improved device of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a fragmentary side elevation of an automobile wheel showing our improved device applied thereto;

Figure 2 is a fragmentary diametric section through an automobile wheel and tire showing our improved device applied thereto, the device being likewise shown in transverse section;

Figure 3 is a fragmentary plan view of the improved device showing the same applied to the tire of an automobile;

Figure 4 is an enlarged detail fragmentary perspective view illustrating the means for detachably connecting one end of one of the tread members to one of the side circumferentially extending chains;

Figure 5 is an outer plan view of one of our novel tread members;

Figure 6 is a longitudinal section through the same taken on the line 6—6 of Figure 5 looking in the direction of the arrows;

Figure 7 is a detail transverse section through one of the tread members taken on the line 7—7 of Figure 6 looking in the direction of the arrows, and Figure 8 is a detail section through one of the tread members taken on the line 8—8 of Figure 7 looking in the direction of the arrows and illustrating the means employed for securing the traction lug anchoring means in place.

Referring to the drawings in detail, wherein similar reference characters designate corresponding parts throughout the several views, the letter A generally indicates our improved device and B an automobile wheel with which the same can be associated.

The wheel B, as shown, includes the usual felly 10, the hub 11, and the connecting spokes 12. The felly 10 has mounted thereon any preferred type of rim 13 for the reception of a pneumatic or other tire 14, with which our improved device is associated.

Referring particularly to our improved device A, the same includes the side circumferentially extending tire chains 15 and 16', which engage the side walls of the tire 14 and which may be applied to the tire in any desired way. Detachably connected to the links of the side chains 15 and 16' at spaced points are our novel transversely extending tread members 16 which form one of the essential features of our invention.

Each of my tread members 16 includes a flat elongated body 17 which may have its sides tapered as at 18 at the ends thereof, as shown in Figure 5 of the drawings.

Each body 17 preferably includes an outer section 19 and an inner section 20. The outer section 19 includes a fabric strip 21 embedded and vulcanized in a hard but flexible rubber portion 22 and this section receives the anchoring members 23 for the removable tread lugs 24. Each anchor or socket 23 includes a hollow internally threaded stem portion 25 and a flat spaced portion 26 and the stem is inserted through the fabric strip 21 and extends outward of the rubber portion 22 to the face thereof, while the base portion is received under the fabric strip. If desired, short metal reinforcing strips 27 can be provided, which can be riveted to the outer face of the fabric strip 21 and to the base of the sockets or anchors. The lugs 24 have each formed thereon threaded studs 28 which are threaded into the hollow stems 25. This permits the free removal of the lugs when the same become worn or mutilated. The inner section 20 also includes a fabric strip 29 which is vulcanized in the rubber body portion 30 of said inner section 20. These sections are connected together by rivets 31 and can be likewise vulcanized together, if desired. End reinforcing plates 32 are provided for the inner and outer faces of the body 17 and are applied to the tapered ends thereof and are secured in place by the rivets 31. Each end of each body 17 of the tread members 16 pivotally receive bail members 33 which have their outer ends provided with bills or hooks 34 which are hooked over the adjacent links of the side circumferential tire chains 15 and 16'.

By this construction it is obvious that a tread member can be removed from the tire without interfering with any other of the tread members and that a tread lug can be removed from any one of the tread members without interfering with the other lugs. The lugs are preferably formed from metal and form a durable tread surface and as more than one lug of each tread member contacts with the ground, a good traction surface will be had.

Changes in details may be made without departing from the spirit or the scope of this invention, but—

What we claim as new is:

A non-skid and traction attachment for vehicle tires comprising side circumferentially extending tire chains and a plurality of spaced transversely extending tread members each including a rubber body, spaced fabric strips embedded in said body, sockets embedded in the body each including a hollow internally threaded stem extending through one fabric strip to the outer surface of the body and a wide base arranged between the fabric strips, reinforcing metal strips placed over the fabric strips through which the hollow stems extend, fastening members connecting the metal strips, the last mentioned fabric strip and the wide bases together, traction lugs including threaded stems detachably received in said hollow stems, and hooks carried by the terminals of the body receiving adjacent links of the side tire chains.

In testimony whereof we affix our signatures.

CHARLES C. PEARSON.
ELI M. McLELLAN.